Aug. 21, 1951 W. A. HATTINK 2,565,022
ADJUSTING MEANS FOR CAM OPERATED ENGINE VALVES
Filed Nov. 15, 1945 2 Sheets-Sheet 1

INVENTOR
W. A. HATTINK
BY
ATTYS.

Aug. 21, 1951 W. A. HATTINK 2,565,022
ADJUSTING MEANS FOR CAM OPERATED ENGINE VALVES
Filed Nov. 15, 1945 2 Sheets-Sheet 2

Inventor
W. A. Hattink

Patented Aug. 21, 1951

2,565,022

UNITED STATES PATENT OFFICE 2,565,022

ADJUSTING MEANS FOR CAM OPERATED ENGINE VALVES

Wilhelmus A. Hattink, Nijmegen, Netherlands

Application November 15, 1945, Serial No. 628,927
In the Netherlands June 1, 1943

Section 1, Public Law 690, August 8, 1946
Patent expires June 1, 1963

2 Claims. (Cl. 121—127)

The invention relates to a fluid pressure engine for one or two directions of rotation and having one or more reciprocating pistons and individual distributing members for each end of the cylinder which control both the admission and the exhaust or only the admission or only the exhaust, each distributing member or each group of similar distributing members being actuated by a cam through the intermediary of an adjustable rocking element which is adjusted in a plane perpendicular to the axis of the cam shaft.

Engines of this kind are known comprising an adjustable lever for actuating a valve which controls the admission or the exhaust for only one cylinder end and is driven by a rocking cam and directly acts on the valve spindle. In said known engine the fulcrum of the lever is adjusted along a path concentric to the pivot axis of the rocking cam in such a manner that the working surface of the lever acting on the valve spindle remains in the same plane. Said adjustment of the lever causes the valve to open and close earlier (or later), so that a shifting of the phase of the valve motion with respect to the rotation of the crank is obtained whereas the angle of rotation of the crank during which the valve is opened is not varied. Said shifting of the phase of the valve, however is only small as the working surface of the adjustable lever remains within the area of the valve spindle. Said known mechanism is therefore only adapted for varying the desired lead angle in engines the rocking cam of which is driven through the intermediary of a mechanism comprising a link or curved guide and being adapted to adjust the admission within wide limits and also to reverse the engine.

The invention has for its object to improve the distributing mechanism for a fluid pressure piston engine in such a manner, that the angle of rotation of the crank during which the distributing member opens the port or delivers fluid may be varied and the position of the crank in which the opening or delivering commences may be prescribed.

According to the invention this is effected by driving the rocking element by means of a continuously rotating cam, said rocking element being adjustable so as to displace the stroke of the element directly driven by the rocking element and at the same time to vary the phase of the motion of said directly driven element with respect to the motion of the piston in such a manner that with each adjustment of the rocking element the opening or delivering of the distributing member commences at a desired position of the crank and ends after the crank has rotated through an angle depending on the adjustment of the rocking element.

In a preferred embodiment of the invention the working surface of the rocking element has a special profile, e. g. a cambered shape, and directly or indirectly actuates the distributing member. In dependence of the shape of said working surface and of the adjustment of the rocking element, the phase and the direction of the motion of the driven element are then shifted in a definite relationship. When using the distributing mechanism for driving the inlet member of a piston engine, either a slide valve, a cock or a poppet valve, it is, therefore, possible to have said inlet member opened at the same position of the crank for each adjustment of the rocking element and closed after the crank has rotated through a variable angle so that a constant lead angle is obtained for varying admission. In similar manner with an exhaust member for one cylinder end a variable compression may be obtained with constant exhaust lead.

The rocking element may advantageously consist of an oscillating lever which is adjustable along a path extending substantially parallel to the path of the element directly driven by the oscillating lever.

Two embodiments of the invention are illustrated in the accompanying drawing.

Figure 2:
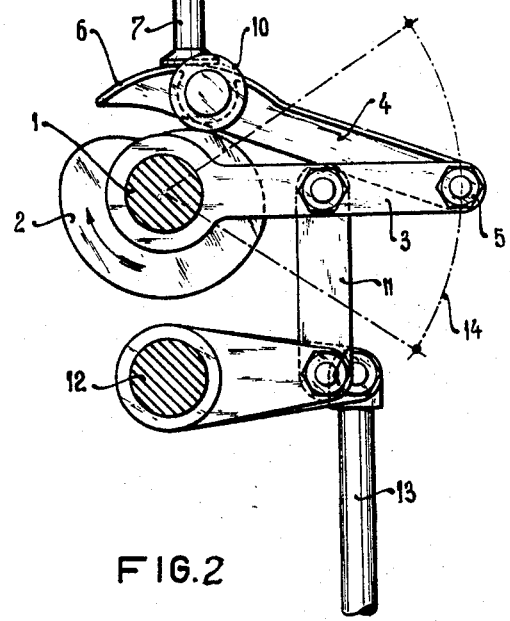
Fig. 2 is a detail view showing the driving gear of the admission valve on a larger scale.

The working cylinder 20 which is closed by a head 21 comprises a piston 22 connected by rod 23 to the crank pin 24. The admission valve 25 has a rod 8 loaded by a spring 9 and is driven by a shaft 1 carrying a cam disc 2. On shaft 1 an adjusting lever 3 is rotatably mounted. The rocking lever 4 oscillates about the pivot 5 (Fig. 2) on the adjusting lever 3 and by means of the working face 6 acts on the push rod 7, said rod transmitting the movement to the valve rod 8.

The rocking lever 4 carried a roller 10 which by the pressure of spring 9 continuously bears against the circumference of the cam disc 2. To the adjusting lever 3 is connected a rod 11 coupled to an arm on the adjusting shaft 12 which receives its motion from rod 13. To this end said rod 13 is connected to a governor or servo-motor 27. In this manner two or more admission valves arranged to work next to each other but in different phases, that is to say, in consequence of the angle formed between adjacent cranks of a multi-cylinder engine, may be controlled by a common governor or servo-motor.

The rod 8a of the exhaust valve 26 is loaded by a spring 9a and receives its motion from the cam disc 2a of shaft 1a through the intermediary of rocking lever 4a carrying roller 10a. Rocking lever 4a is pivotally connected to lever 3a which is rotatably mounted on shaft 1a.

Steam is supplied to the valve-chest 28 and enters the cylinder 20 through port 29 and leaves the cylinder through ports 30 and 31 the former of which is controlled by valve 26, the latter by piston 22.

When the lever 3 is adjusted the pivot axis 5 of the rocking lever 4 is displaced along the arc of the circle 14 the connection of the extremities of which is substantially vertical and consequently parallel to push rod 7. If, now, the pivot axis 5 is adjusted along the arc 14 e. g. upwards, said adjustment causes when the cam disc 2 rotates in the direction of the arrow indicated in the drawing a shifting of the phase of the slide valve motion in the direction of rotation of shaft 1 so that the inlet port is earlier opened and closed. As, however, also the centre of curvature of the working surface 6 of lever 4 is displaced upwards the course of the slide valve as a whole comes at a higher level so that the port is later opened and earlier closed. The admission is therefore decreased. By suitable designing the adjusting arc 14 and the curvature of the working surface 6 it is possible to have the moment at which the port is opened to take place for different positions of lever 3 at the same position of the crank, namely just before the dead centre.

When the distributing member is formed by the plunger of a pump, e. g. of the injection pump for an internal combustion engine or of the driving pump of a hydraulic valve gear, the effective stroke of the pump may be varied with prescribed commencement of delivering the fluid in similar manner as indicated above.

When the distributing member consists of a mechanical moved poppet valve said latter cannot be directly actuated by push rod 7. In this case the motion of the rocking lever is transmitted to a pivotal arm which is formed as an oscillating cam and actuates the valve spindle.

Figure 1:
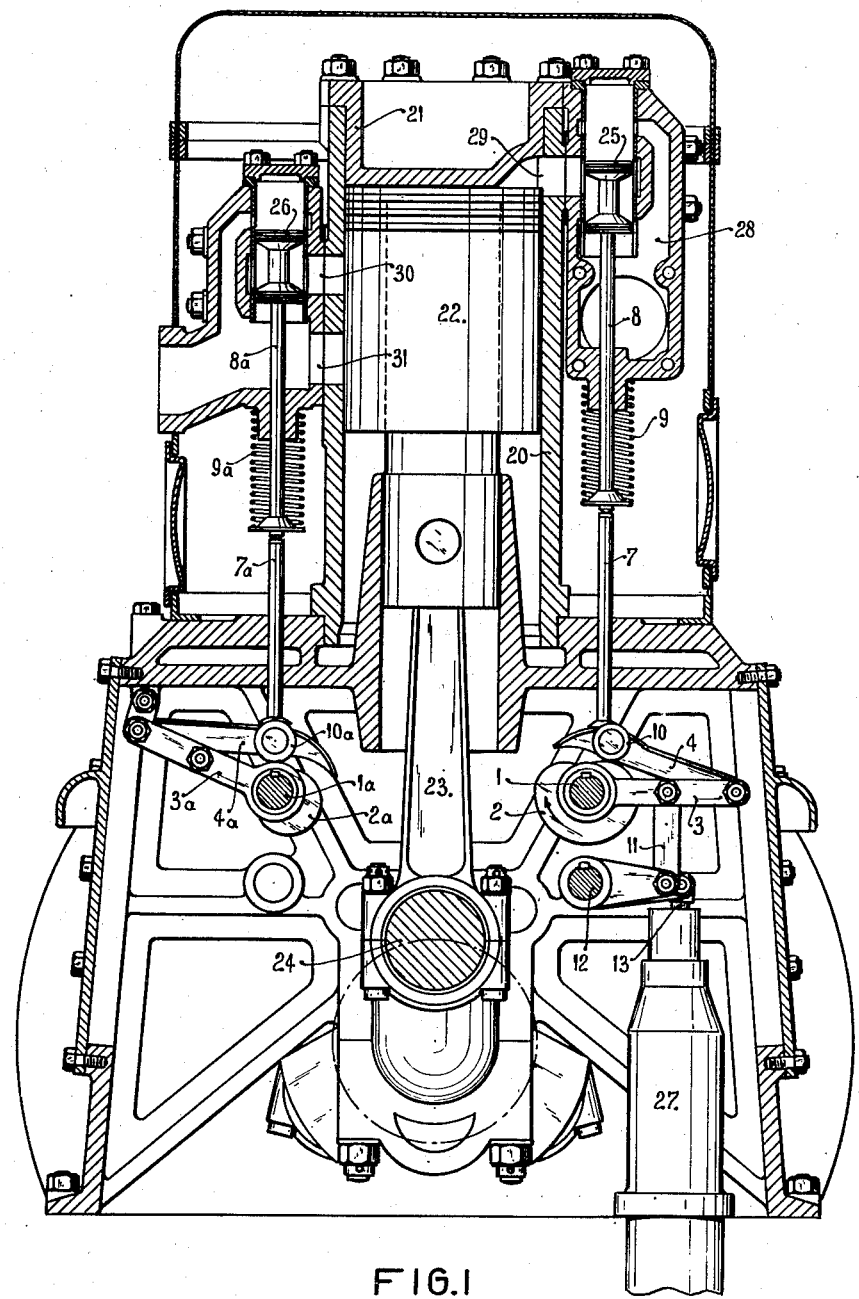
Fig. 1 is a fragmentary sectional elevation of a steam engine the admission member and the exhaust member of which are in the form of slide valves.
Figure 3:
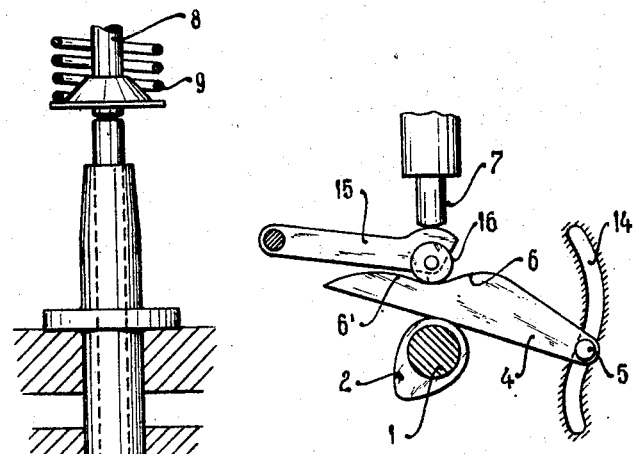
Fig. 3 is a diagrammatic view of another embodiment of the invention.

From Fig. 3 it is evident that the adjusting path may also be realized by a slot 14 within which the pivot axis 5 of the rocking lever 4 can be adjusted. The working surface 6 of the rocking lever is in this constructional form extended with a part 6' and cooperates with a pivotal lever 15 through the intermediary of a roller 16 carried by said lever so that this mechanism is adapted for both directions of rotation of the driving shaft 1.

What I claim is:

1. In a fluid pressure engine, a cylinder, a valve and a piston in said cylinder, a driven element for actuating the valve, a driving mechanism for said valve comprising a single continuously rotating cam, a single rocking element engaged and rocked by said cam and provided with a cambered working surface directly engaging said driven element, the center of curvature of said cambered working surface lying at the same side of the rocking element as the axis of the cam, and means connected to and supporting the rocking element, said supporting means being movable to shift said rocking element relative to said cam in a plane perpendicular to the axis of the cam so as to displace the stroke of the driven element.

2. A fluid pressure engine as claimed in claim 1, in which the adjustable rocking element is formed as a lever having one of its ends adjusted along an arc of a circle having its centre in the axis of the cam shaft.

WILHELMUS A. HATTINK.

REFERENCES CITED

The following references are of record in the file of this patent:

UNITED STATES PATENTS

| Number | Name | Date |
| --- | --- | --- |
| 2,147,989 | Puurmann | Feb. 21, 1939 |

FOREIGN PATENTS

| Number | Country | Date |
| --- | --- | --- |
| 5,339 | Great Britain | Dec. 31, 1878 |
| 259,838 | Great Britain | Oct. 21, 1926 |
| 170,203 | Germany | Apr. 30, 1906 |
| 59,491 | Switzerland | Mar. 23, 1912 |